United States Patent
Sen et al.

(10) Patent No.: US 11,120,593 B2
(45) Date of Patent: Sep. 14, 2021

(54) SYSTEMS AND METHODS FOR DYNAMIC VISUAL ADJUSTMENTS FOR A MAP OVERLAY

(71) Applicant: Rovi Guides, Inc., San Jose, CA (US)

(72) Inventors: Susanto Sen, Karnataka (IN); Shakir Sharfraz Ashfaq Ahamed, Karnataka (IN); Sriram Ponnusamy, Tamil Nadu (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/421,841

(22) Filed: May 24, 2019

(65) Prior Publication Data
US 2020/0372696 A1 Nov. 26, 2020

(51) Int. Cl.
*G06T 11/60* (2006.01)
*G06T 3/40* (2006.01)
*G06T 3/60* (2006.01)
*G06T 11/00* (2006.01)

(52) U.S. Cl.
CPC .............. *G06T 11/60* (2013.01); *G06T 3/40* (2013.01); *G06T 3/60* (2013.01); *G06T 11/001* (2013.01); *G06T 2210/22* (2013.01)

(58) Field of Classification Search
CPC ... G06T 11/60; G06T 3/40; G06T 3/60; G06T 11/001; G06T 2210/22
See application file for complete search history.

(56) References Cited

U.S. PATENT DOCUMENTS

| | | | |
|---|---|---|---|
| 2002/0154168 A1* | 10/2002 | Ijas | G06F 3/0481 715/764 |
| 2011/0208417 A1 | 8/2011 | Fink et al. | |
| 2013/0345980 A1 | 12/2013 | Van Os et al. | |
| 2014/0095303 A1 | 4/2014 | Jones et al. | |
| 2014/0240348 A1* | 8/2014 | Arita | G06T 11/203 345/629 |
| 2014/0313229 A1* | 10/2014 | Arita | G06T 11/60 345/634 |
| 2014/0359656 A1* | 12/2014 | Banica | H04N 21/234 725/32 |
| 2015/0160841 A1* | 6/2015 | Chang | G06F 3/14 345/659 |
| 2015/0161762 A1* | 6/2015 | Fujiwara | G06T 11/60 345/633 |
| 2015/0232030 A1 | 8/2015 | Bongwald | |
| 2016/0003636 A1 | 1/2016 | Ng-Thow-Hing et al. | |
| 2016/0011854 A1 | 1/2016 | Furumoto et al. | |
| 2017/0061696 A1* | 3/2017 | Li | G02B 27/017 |
| 2017/0148222 A1* | 5/2017 | Holzer | G06F 16/5838 |
| 2018/0058877 A1* | 3/2018 | Andrew | G06T 11/00 |

(Continued)

FOREIGN PATENT DOCUMENTS

JP 2015215619 A 12/2015

*Primary Examiner* — Phuc N Doan
(74) *Attorney, Agent, or Firm* — Haley Guiliano LLP

(57) ABSTRACT

Systems and methods for adjusting a display size of a map overlay. A mapping application generates for display a virtual map in an overlay area that does not obstruct important portions of displayed content. As the mapping application receives location information, the mapping application adjusts the size of the virtual map overlay such that relevant landmarks are shown on the virtual map and important portions of the displayed content are not obstructed.

21 Claims, 11 Drawing Sheets

(56) References Cited

U.S. PATENT DOCUMENTS

| | | | |
|---|---|---|---|
| 2018/0088323 A1 | 3/2018 | Bao et al. | |
| 2018/0093663 A1* | 4/2018 | Kim | G08G 1/168 |
| 2018/0330515 A1* | 11/2018 | Stall | G06T 15/00 |
| 2019/0003851 A1* | 1/2019 | Ishikawa | G01C 21/3676 |
| 2019/0041231 A1 | 2/2019 | Kitada | |
| 2019/0043259 A1* | 2/2019 | Wang | G06F 3/04815 |
| 2019/0156573 A1* | 5/2019 | Palos | G06T 19/20 |
| 2019/0340837 A1* | 11/2019 | Shmayahu | G06T 17/00 |
| 2020/0090401 A1* | 3/2020 | Terrano | G06F 3/0482 |
| 2020/0125244 A1* | 4/2020 | Feinstein | G06F 3/0485 |

\* cited by examiner

SYSTEMS AND METHODS FOR DYNAMIC VISUAL ADJUSTMENTS FOR A MAP OVERLAY

BACKGROUND

The present disclosure is directed to mapping applications, and more particularly to mapping applications that provide map overlays for simultaneous use with other applications.

SUMMARY

Mapping applications are a crucial component of modern navigation, providing users with the means for tracking, getting directions, and viewing different parts of the world. In some scenarios, users may access mapping applications simultaneously with other applications (e.g., such as when tracking the arrival of a taxi while watching a movie on a media streaming application). The integration between mapping applications and other applications leaves a lot to be desired, however, as simultaneously displaying a mapping application with another application often involves using split-screen views or hovering windows. Because the applications operate independently, the mapping application provides no way of adjusting the visual features (e.g., the size, colors, orientation, position, etc.) of a virtual map to strike a balance between maximizing the amount of relevant map information presented to the user and minimizing the amount of obstruction over important portions of the secondary content being accessed on a different application.

Systems and methods are thus described herein for dynamically adjusting the visual features (e.g., a display size) of a map overlay based on both the secondary content being accessed by a user and the landmarks to display in the map overlay. In one embodiment, a mapping application running on a device receives, at a first time, map information with a first location. The mapping application detects that other content is also being displayed on the device. In order to generate a virtual map over the displayed content without obstructing important portions of the displayed content, the mapping application identifies an overlay area on the displayed content where an overlay can be generated. The mapping application subsequently generates, for display on the device, a virtual map overlaid on the displayed content. The display area of the virtual map is kept within the overlay area to avoid significant blockage of the displayed content. The virtual map additionally depicts an indicator of the first location (e.g., a visual representation of the first location such as a marker, text, or image).

At a later time, the mapping application may receive updated map information with a second location. The mapping application identifies a landmark that is not already displayed on the virtual map and that is within a threshold distance from the second location. A landmark is any position on the virtual map that can be identified by a name (e.g., Wall Street), an address (e.g., 2160 Gold Street, San Jose, Calif.), and/or coordinates (e.g., from a global positioning system). In response to determining that the landmark should be displayed on the virtual map, the mapping application adjusts a size of the display area to include the landmark. In addition to adjusting the size of the display area, the mapping application generates for display both an indicator of the landmark and an indicator of the second location on the virtual map.

By adjusting the size of the map overlay to include relevant landmarks, the mapping application provides more information to the user. At the same time, because the map overlay is kept within the bounds of the overlay area, the important portions of the frame of the displayed content are not covered. This balance between the virtual map and the displayed content optimizes the user's access to information—both map-based and content-based.

To further minimize the amount of obstruction caused by the map overlay, the mapping application may generate a transparent map with a level of opacity that allows the user to partially view the displayed content underneath the map overlay. In some embodiments, the mapping application identifies overlapping portions of the displayed content and the virtual map (e.g., a first portion of the displayed content and a second portion of the virtual map). The mapping application determines a first color of the displayed content in the first portion and adjusts, in the second portion, a second color of the virtual map to decrease the contrast between the virtual map and the displayed content. The adjustment of the second color allows the virtual map to stand out from displayed content while still retaining the visual look of the displayed content underneath the virtual map.

Identifying an appropriate overlay area can also minimize the amount of obstruction caused by the map overlay. An overlay area is a portion of a frame of the displayed content where an overlay can be generated. This portion ideally features no important content. Depending on the displayed content, important content may be faces, locations, game scores, logos, subtitles, etc. In some embodiments, the mapping application retrieves metadata of the displayed content, which indicates a plurality of overlay areas where an overlay can be generated. The mapping application identifies, from the plurality of overlay areas, a candidate overlay area and determines whether a size of the candidate overlay area is greater than respective sizes of overlay areas in the plurality of overlay areas. In response to determining that the size of the candidate overlay area is greater than the respective sizes of the overlay areas in the plurality of overlay areas, the mapping application selects the candidate overlay area as the overlay area on which to generate the virtual map.

The size of an overlay area may also change over time. For example, as characters move in different frames of a movie, the overlay area may shrink or expand. Accordingly, the mapping application adjusts the size of the virtual map to minimize obstruction. The mapping application may detect that a size of the overlay area has decreased and may determine whether the size of the display area is greater than the decreased size of the overlay area. In response to determining that the size of the display area is greater than the decreased size of the overlay area, the mapping application decreases the size of the display area. Alternatively, in response to determining that the overlay area has increased, the mapping application may increase the size of the virtual map until the display area equals the size of the overlay area.

Thus far, this disclosure has focused on adjusting the visual features of a map overlay based on the changes in the displayed content that is underneath the overlay. In addition to these content-dependent visual adjustments, the mapping application adjusts the visual features of the map overlay based on map information. Map information includes indicators and landmarks that the user may be interested in seeing on the map overlay. In some embodiments, the mapping application identifies, in a user profile stored on the device, a plurality of landmarks previously visited by a user associated with the user profile. The mapping application determines a distance between a landmark of the plurality of landmarks and the second location. In response to determining that the distance is less than the threshold distance, the mapping application selects the landmark of the plurality of landmarks to include in the virtual map.

The mapping application may constantly receive new location information (e.g., if the user is tracking his/her own position or another device's position) and thus update the map overlay. In some embodiments, the mapping application receives, at a third time, updated map information comprising a third location. In response to determining that the landmark is not within the threshold distance from the third location, the mapping application decreases the size of the display area. This decreasing may involve cropping the virtual map to remove a portion of the virtual map comprising the landmark. In this scenario, the size of the indicators and landmarks in the virtual map are kept constant. However, the mapping application may also increase a range of land depicted in the virtual map by shrinking visual content in the virtual map. This essentially increases the threshold distance to the extent that the landmark is still within range of the third location.

If the mapping application is tracking directions from a first location to a destination, the mapping application may determine a virtual path between an indicator of the first location and an indicator of the destination. Because a route is now to be depicted, the mapping application may account for the curvature of the route and determines a best fit that minimizes the level of obstruction over the displayed content. Accordingly, the mapping application rotates the virtual map to simultaneously display the indicator of the first location and the indicator of the destination on the virtual map without adjusting the size of the display area.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
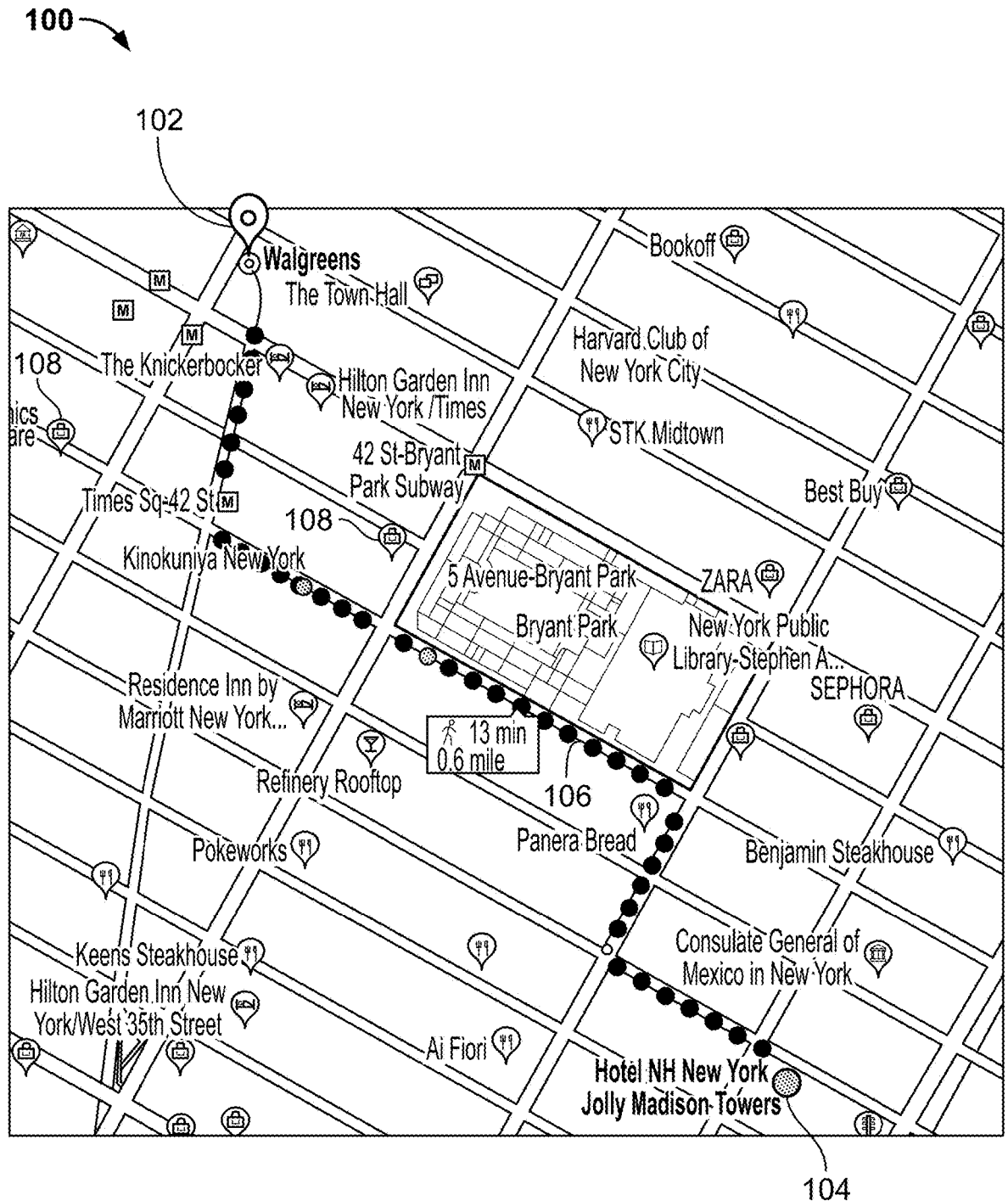
FIG. 1 shows an illustrative example of a map with information to display in an overlay, in accordance with some embodiments of the disclosure.

FIG. 1 shows illustrative example 100 of a map with information to display in an overlay, in accordance with some embodiments of the disclosure. Mapping applications are used for various reasons, including tracking a user's position, getting directions and viewing streets and landmarks. Due to the abundance of services such as food delivery, online shopping, taxi requests, etc., users are interested in tracking other devices as well. For example, a user may order food using a food delivery service such as Uber Eats™. Certain food delivery services provide real-time tracking of deliveries by displaying the position of the driver's vehicle as he/she is making the delivery. In example 100, suppose that the route (e.g., route 106) of a vehicle is being tracked from location 102 (e.g., Walgreens) to destination 104 (e.g., a hotel). In the vicinity of the respective locations are various indicators of landmarks (e.g., landmarks 108). A landmark is any position on the map that can be identified with a name, an address, or coordinates. For simplicity, only a few positions on the map are labelled as landmarks 108. It should be noted, however, that landmarks 108 may include the streets, the park, the buildings, the intersections, the street lights, etc.

Figure 2:
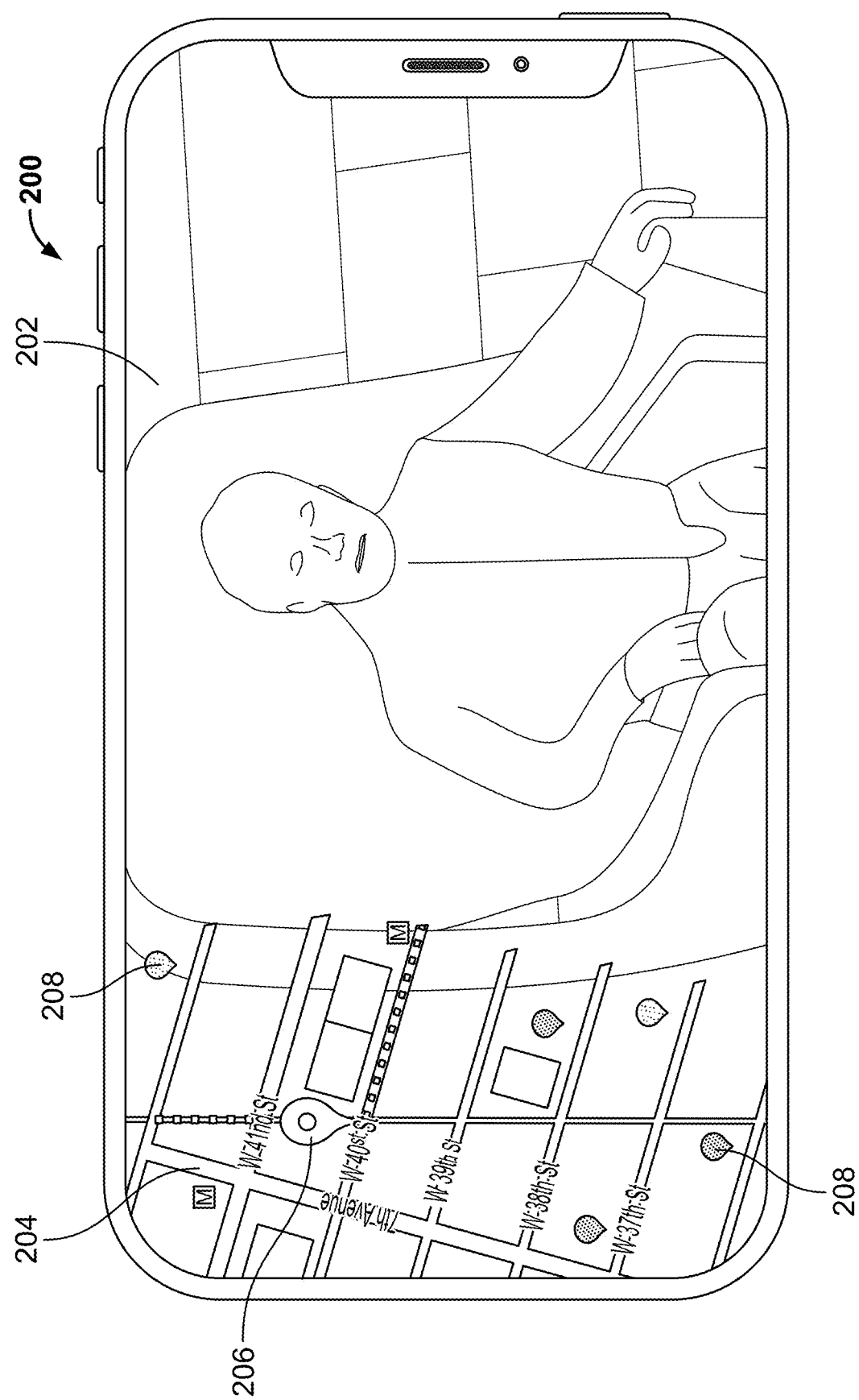
FIG. 2 shows an illustrative example of a map overlay displaying a first location and landmarks in the vicinity of the first location, in accordance with some embodiments of the disclosure.

FIG. 2 shows illustrative example 200 of a map overlay displaying a first location and landmarks in the vicinity of the first location, in accordance with some embodiments of the disclosure. Although the user can continuously view the vehicle's position from the start of an order to its completion, users normally access other applications while waiting. If the user is interested in viewing the vehicle's position, the user can run the mapping application simultaneously with the other application the user is accessing (e.g., as a PIP window or using a split-screen view). In this disclosure, the map is overlaid on another application. Overlaying is a difficult task because the other application will be obstructed. It is possible, however, that not all portions of the other application are important. For example, the other application may be a media streaming application such as "HBO Now"™. In example 200, content 202 (e.g., an episode of "Game of Thrones"™) is being accessed on a smartphone. A portion of the map in example 100 is displayed on the left side of the screen as overlay 204.

In one embodiment, a mapping application running on the smartphone receives, at a first time, map information with location 206. The mapping application detects that content 202 is also being displayed on the device. In order to generate a virtual map over the displayed content without obstructing important portions of the displayed content, the mapping application identifies an overlay area on the displayed content where an overlay can be generated.

One way that the mapping application identifies the overlay area is by using image processing to classify the objects in a given frame of content 202. For example, the mapping application detects a human, a chair, and several swords in the frame. The classification algorithm can be used to block sections of the frame into a plurality of areas. The mapping application may then use edge detection to identify the edges of each area (e.g., by determining the bordering pixels of each area). The mapping application retrieves a list of objects that should not be obstructed. The list may include objects such as "faces," "humans," "logos," etc. In example 200, the mapping application may determine that the area comprising the human should not be obstructed. The overlay area is therefore every part of the frame that is not the area comprising the image of the human.

Alternatively, the mapping application determines the overlay area based on metadata associated with content 202. For example, the mapping application retrieves metadata of the content 202 from a content server, wherein the metadata indicates a plurality of overlay areas where an overlay can be generated. The plurality of overlay areas may be specific to each frame of content 202. For example, in frame 1, an appropriate overlay area may be the right half of the frame, according to the metadata. In frame 1000, on the other hand, an appropriate overlay area may be the bottom quarter of the frame. In order to maximize the amount of screen space allotted to the map overlay, the mapping application identifies, from the plurality of overlay areas, a candidate overlay area and determines whether a size of the candidate overlay area is greater than the respective sizes of all other overlay areas in the plurality of overlay areas. In response to determining that the size of the candidate overlay area is greater than the respective sizes of all other overlay areas in the plurality of overlay areas, the mapping application selects the candidate overlay area as the overlay area on which to generate the virtual map.

It should be noted that the mapping application may not use the entirety of an overlay area to generate the map overlay. For example, even if the overlay area covers 40% of the frame of content 202, the mapping application may use only 30%. The intent here is to use the full overlay area only when necessary (e.g., when relevant map information should be presented). Even if a portion of the frame of content 202 does not feature a human, the user may be interested in viewing as much of content 202 as possible. In example 200, the overlay area is any portion of the frame that does not block the human character.

The mapping application subsequently generates, for display on the smartphone, a virtual map overlaid (e.g., overlay 204) on content 202. The display area of the virtual map is kept within the overlay area to avoid significant blockage of content 202. The generation of the virtual map is performed according to a visual configuration retrieved from memory by the mapping application. The visual configuration provides information on text font, font size, indicator colors, indicator size, street width, route line appearance. For example, the mapping application may generate overlay 204 such that the font for text is "Arial," the font size is "10 pt.," the street width is 20 pixels, the route line is a dotted line, and the indicator colors are based on a color palette including blue, orange, red, and white. The initial scale of landmarks is determined by the mapping application based on the street width in pixels (e.g., 1:2). The visual configuration may be adjusted by the user and linked to the user profile of the user.

The generation of overlay 204 also involves identifying the relevant landmarks in the vicinity of location 206. The mapping application may identify, in a user profile stored on the smartphone, a plurality of landmarks previously visited by a user associated with the user profile or marked by the user as "of interest." The mapping application determines a distance between a landmark of the plurality of landmarks and location 206. In response to determining that the distance is less than the threshold distance (e.g., 1 kilometer (km)), the mapping application selects the landmark of the plurality of landmarks to include in the virtual map. Landmarks 208 comprise indicators of positions on the map that the user may have previously visited. Generating landmarks 208 on the virtual map allows the user to get a sense of the location 206's position in the virtual map relative to familiar landmarks. For simplicity, landmarks 208 points to only two indicators in example 200, but landmarks 208 may also include the streets (e.g., $7^{th}$ Avenue, W. $38^{th}$ St., etc.), the buildings, the public transportation location, and the other indicators on the map.

To minimize the amount of obstruction caused by overlay 204 on content 202, the mapping application may increase the transparency of overlay 204 to an opacity that allows the user to partially view content 202 underneath the map overlay. As seen in example 100, the portions of the map between the streets from W. $38^{th}$ Street to W. $42^{nd}$ Street are empty. Accordingly, the mapping application decreases the opacity of those portions to near zero, allowing content 202 to appear in between the streets depicted in overlay 204. In some embodiments, the mapping application identifies overlapping portions of the content 202 and overlay 204 (e.g., the portion depicting the buildings between W. $41^{st}$ St and W. $42^{nd}$ St on overlay 204). The mapping application determines a first color of the content 202 in that portion (e.g., brown) and adjusts, in that portion, a second color of overlay 204 to decrease the contrast between overlay 204 and content 202 (e.g., changes the second color to light brown). The adjustment of the second color allows overlay 204 to stand out from content 202 while still retaining the visual look of content 202 underneath overlay 204.

Figure 3:
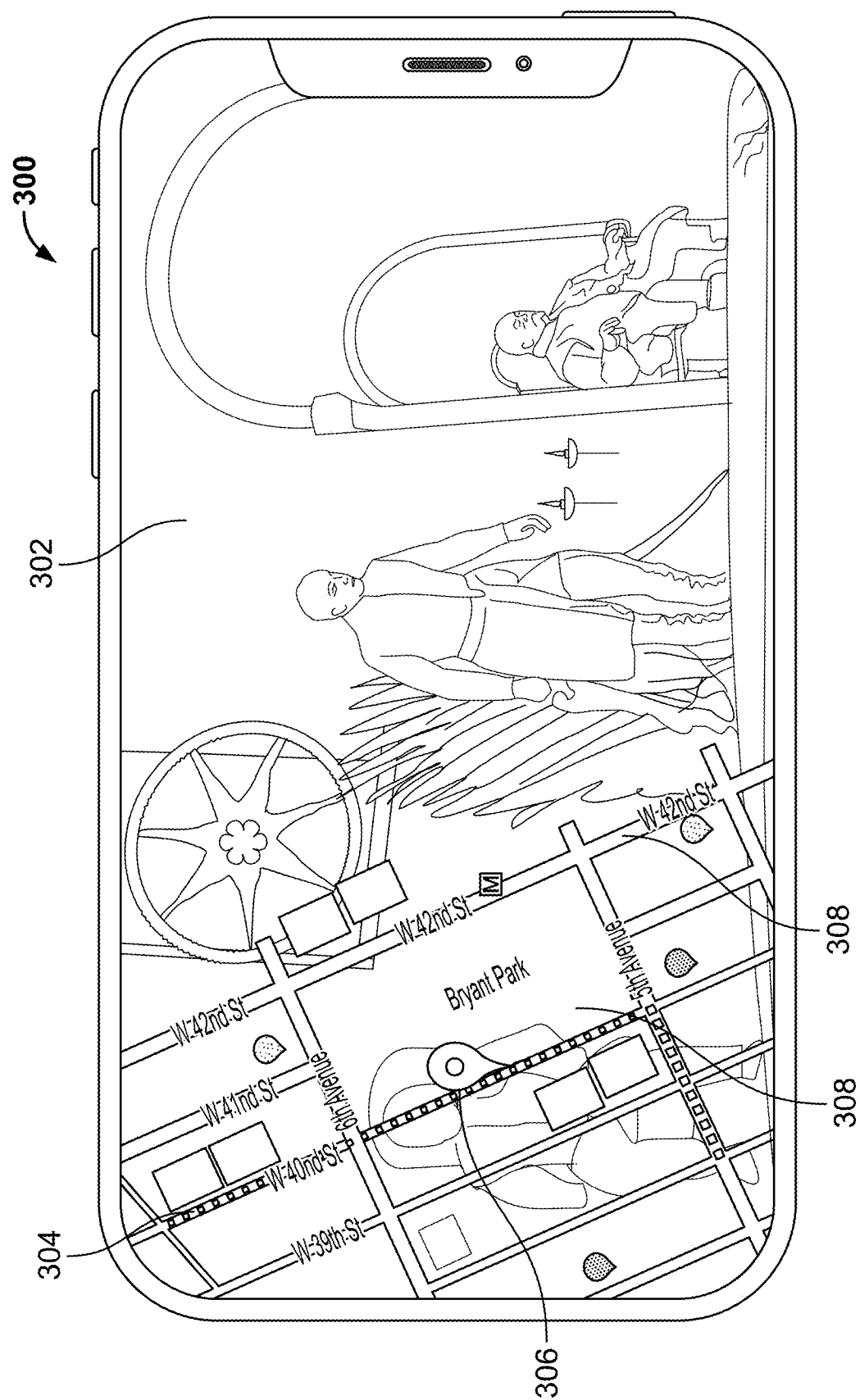
FIG. 3 shows an illustrative example of a large map overlay displaying a second location and landmarks in the vicinity of the second location, in accordance with some embodiments of the disclosure.

FIG. 3 shows illustrative example 300 of a large map overlay displaying a second location and landmarks in the vicinity of the second location, in accordance with some embodiments of the disclosure. At a later time, the mapping application may receive updated map information with location 306 (e.g., indicating movement from location 206 to location 306). It should be noted that two elements of example 200 have changed in example 300. The first change is in content 202. Content 302 may be a later frame of the same episode of "Game of Thrones" or may be a different type of content of a different application altogether (e.g., a video game). Accordingly, the overlay area may be different from the overlay area previously identified. For simplicity, the overlay area in example 300 remains all portions of the frame that are not depicting the human from the frame depicted in content 202. This does increase the overlay area because the portion of the frame occupied by the image of human has decreased. This indicates that overlay 304 can be increased in size. The second change is in the landmarks that are in the vicinity of the updated location (i.e., location 306). The mapping application thus determines a new balance in the display size of overlay 204 such that obstruction of the new frame is minimized and display of landmark information is maximized.

In response to receiving location 306, the mapping application identifies a landmark that is not already displayed on overlay 204 and that is within a threshold distance from the location 306. For example, the mapping application may identify Bryant Park as a landmark. Another set of landmarks that the mapping application may identify are the buildings between W $41^{st}$ St and W $42^{nd}$ St (which are within the threshold distance from both location 206 and location 306). Landmarks 308 highlights a few landmarks presented in overlay 304. The mapping application subsequently determines whether the identified landmarks should be included in the virtual map based on user preference. For example, in response to determining that the landmark Bryant Park should be displayed on the virtual map (e.g., the user profile of the user indicates that parks should be included), the mapping application adjusts a size of the display area to include the landmark. In example 300, this involves increasing the display area of overlay 204 from the size presented in example 200 to the size presented in example 300. It should be noted that overlay 304 still does not occupy the entirety of the frame outside of the portion occupied by the image of the human. This is because the mapping application has presented, within the threshold distance from location 306, all relevant landmarks and does not need additional display real estate of the frame of content 302. The user may adjust the threshold distance to increase or reduce the range of landmarks to depict on the virtual map.

Figure 4:
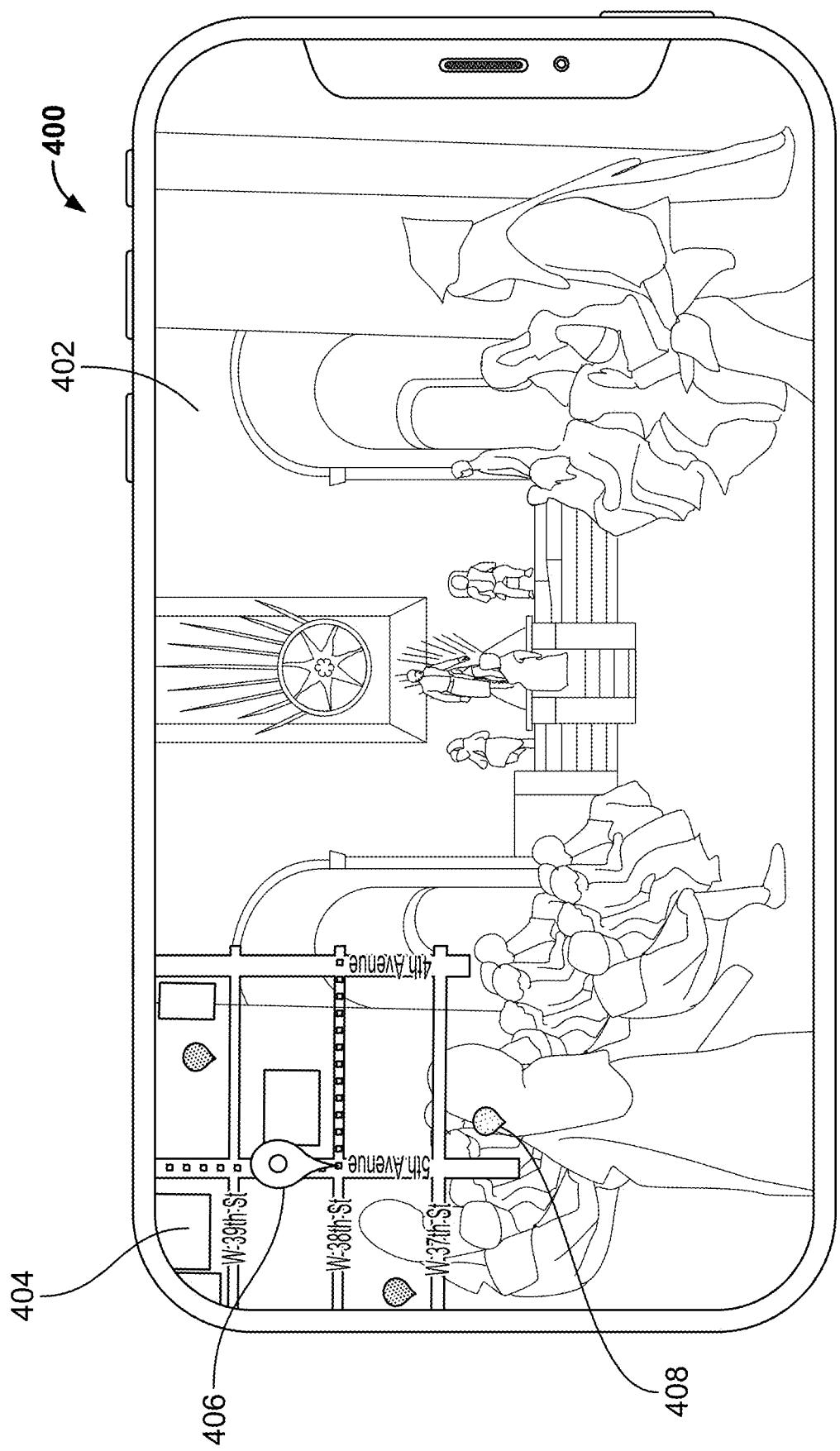
FIG. 4 shows an illustrative example of a small map overlay displaying a third location and landmarks in the vicinity of the third location, in accordance with some embodiments of the disclosure.

FIG. 4 shows illustrative example 400 of a small map overlay displaying a third location and landmarks in the vicinity of the third location, in accordance with some embodiments of the disclosure. The receiving of map information by the mapping application may be a real-time occurrence. For example, the mapping application may constantly receive new location information (e.g., if the user is tracking his/her own position or another device's position) and may update size of the map overlay based on the changes in the overlay area and the changes in landmarks. In some embodiments, the mapping application receives, at a third time, updated map information comprising location 406. In response to determining that the landmark (e.g., Bryant Park) is not within the threshold distance from location 406, the mapping application decreases the size of the display area. In example 300, the presence of Bryant Park caused the mapping application to increase the size of overlay 304. As the tracked location moves farther away from Bryant Park, the landmark moves out from range as embodied by the threshold distance. Without a need to show Bryant Park, the mapping application decreases the display area of the virtual map by cropping the virtual map to remove a portion of the virtual map comprising the landmark, Bryant Park.

Overlay 404 is smaller than overlay 304 because fewer relevant landmarks (e.g., some labeled as landmarks 408) are within a threshold distance from location 406. It should be noted that if the same classification of the overlay area exists for the frame of content 402 (e.g., all portions of the frame that do not depict the image of the human in example 200), then the overlay area has increased in size. Despite this, overlay 404 does not occupy a larger part of the frame.

In an example where the mapping application detects that a size of the overlay area has decreased, the mapping application may determine whether the size of the display area is greater than the decreased size of the overlay area. In response to determining that the size of the display area is greater than the decreased size of the overlay area, the mapping application decreases the size of the display area. For example, the mapping application may reduce the number of landmarks to depict on the virtual map by automatically reducing the threshold distance to the extent that the size of the display area and the size of the overlay area are equal. Alternatively, the mapping application may reduce the sizes of the indicators, fonts, and street widths to include all relevant landmarks within the threshold distance on the virtual map. This shrinking process is different from the cropping process discussed previously, as the cropping process did not involve adjusting the sizes of the individual components (e.g., landmarks, indicators, text, etc.) on the virtual map. The mapping application may specifically shrink the virtual map to occupy a portion of the frame within the smaller overlay area.

Another aspect of examples 200-400 to consider is the orientation of the virtual map in each overlay. In example 200, the virtual map has a first orientation. In example 300, the virtual map is rotated to a second orientation. In example 400, the virtual map is rotated again, to a third orientation. In order to fit all of the landmarks within the overlay area, the mapping application may rotate the virtual map. In example 200, the overlay area may be the left third of the frame. The mapping application identifies landmarks 208 which are within the threshold distance from location 206, but would fit within the overlay area only if oriented such that each landmark is in a corner opposite that of overlay 204. The mapping application may thus identify multiple shortest paths from location 206 to a landmark and also multiple shortest paths between respective landmarks. The mapping application identifies, from all of the determined shortest paths, the shortest path with the largest displacement. The identified shortest path with the largest displacement is then aligned by the mapping application, with the largest vector in the overlay. For example, the largest vector in overlay 204 is the diagonal vector from the top right corner pointing to the bottom right corner. When generating overlay 204 for display, the mapping application rotates the virtual map from example 100 based on the alignment.

Figure 5:
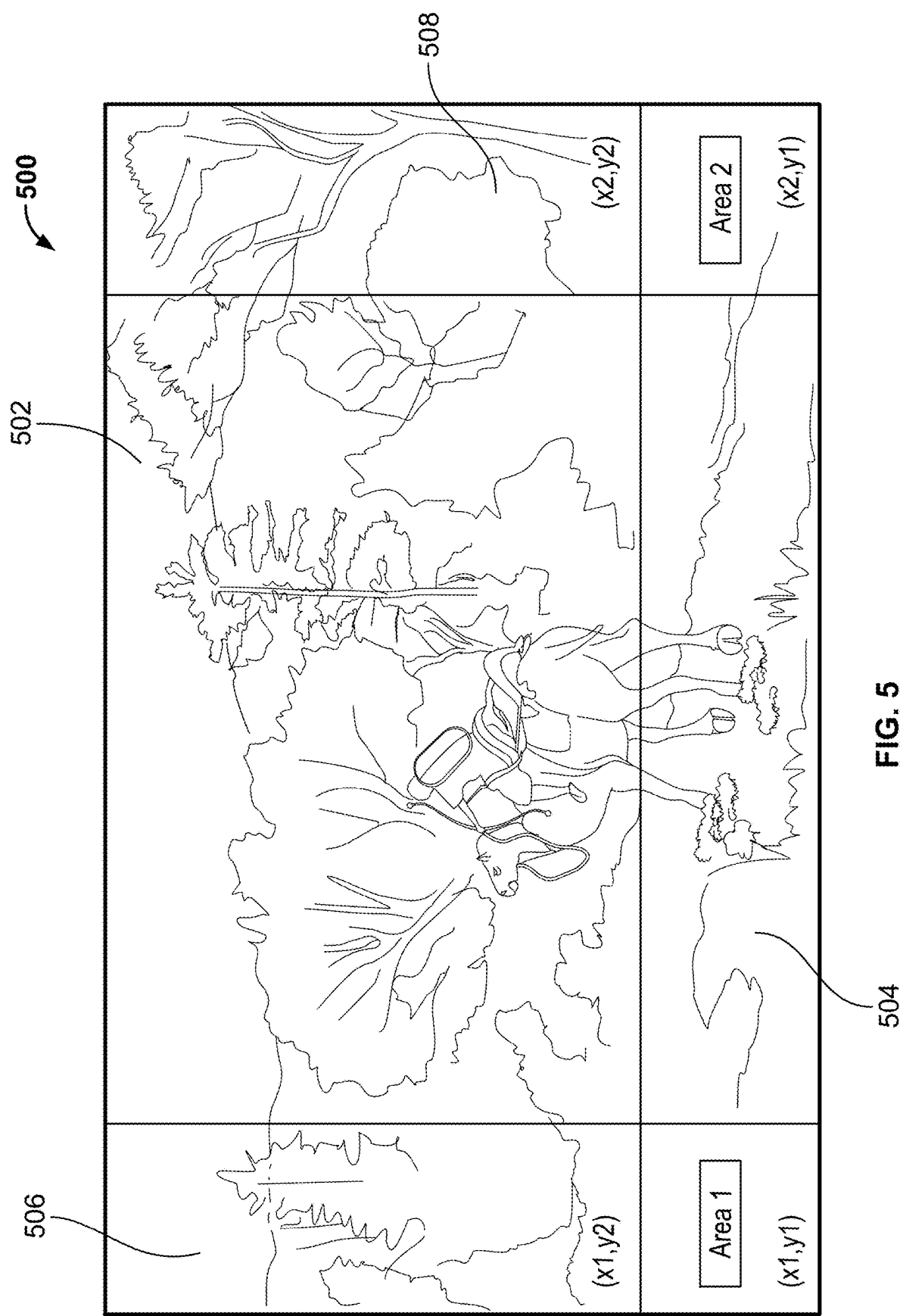
FIG. 5 shows an illustrative example of candidate overlay areas for the map overlay, in accordance with some embodiments of the disclosure.

FIG. 5 shows illustrative example 500 of candidate overlay areas for the map overlay, in accordance with some embodiments of the disclosure. Content 502 may be a different frame of the same content previously shown in content 202, content 302, and content 402. Content 502 may also be a different type of content (e.g., a video game, an image, etc.). Overlay areas 504, 506 and 508 are candidate portions of the frame where control circuitry 604 may generate the map overlay. Area 1 and area 2 are overlapping portions of the three overlay areas. In some embodiments, control circuitry 604 may combine multiple overlay areas to include all necessary map elements (e.g., landmarks, indicators, compass, etc.) in the virtual map. Utilizing the various overlay areas of example 500 is further discussed in process 900 of FIG. 9.

Figure 6:
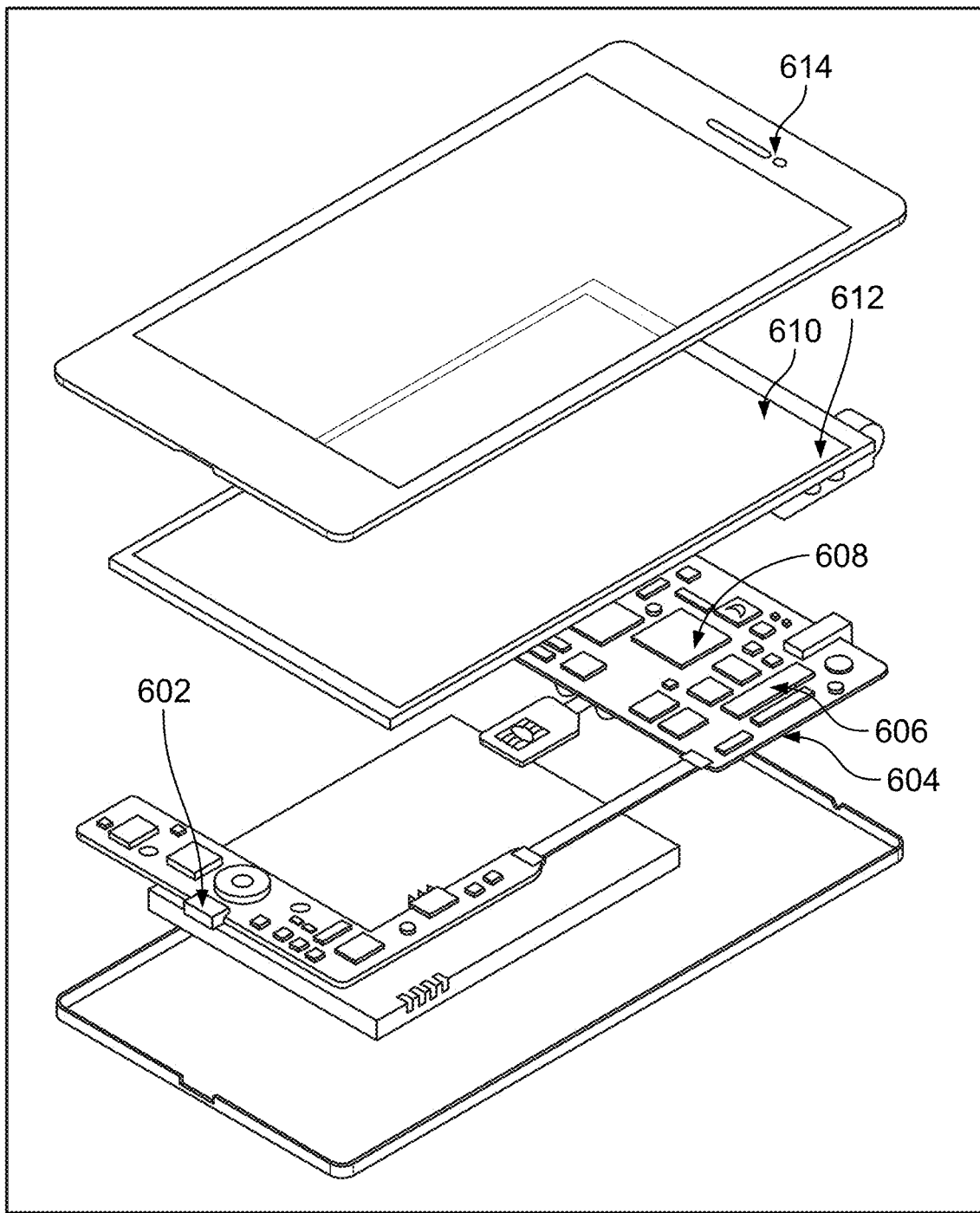
FIG. 6 is a diagram of an illustrative device, in accordance with some embodiments of the disclosure.

FIG. 6 shows a generalized embodiment of illustrative device 600. As depicted in FIG. 6, device 600 is a smartphone. However, device 600 is not limited to smartphones and may be any computing device. For example, device 600 of FIG. 6 can be implemented in system 700 of FIG. 7 as device 702 (e.g., a smartphone, a smart television, a tablet, a computer, or any combination thereof).

Device 600 may receive data via input/output (hereinafter I/O) path 602. I/O path 602 may provide received data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communication paths (described below). I/O functions may be provided by one or more of these communication paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a mapping application stored in memory (i.e., storage 608).

A mapping application may be a stand-alone application implemented on a device or a server. The mapping application may be implemented as software or a set of executable instructions. The instructions for performing any of the embodiments discussed herein of the mapping application may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 6 the instructions may be stored in storage 608, and executed by control circuitry 604 of a device 600.

In some embodiments, a mapping application may be a client-server application where only the client application resides on device 600 (e.g., device 702), and a server application resides on an external server (e.g., map server 706). For example, a mapping application may be implemented partially as a client application on control circuitry 604 of device 600 and partially on map server 706 as a server application running on control circuitry. Map server 706 may be a part of a local area network with device 702, or may be part of a cloud computing environment accessed via the Internet. In a cloud computing environment, various types of computing services for performing searches on the Internet or informational databases, providing storage (e.g., for the database of notable landmarks) or parsing data are provided by a collection of network-accessible computing and storage resources (e.g., map server 706), referred to as "the cloud." Device 600 may be a cloud client that relies on the cloud computing capabilities from map server 706 to generate the virtual map and content server 708 for overlay area identification. When executed by control circuitry of map server 706, the mapping application may instruct the control circuitry to adjust the size of the display area and transmit the size dimensions to device 702. The client application may instruct control circuitry of the receiving device 702 to generate the mapping application output. Alternatively, device 702 may perform all computations locally via control circuitry 604 without relying on map server 706 or content server 708.

Control circuitry 604 may include communications circuitry suitable for communicating with a mapping application server or other networks or servers. The instructions for carrying out the above-mentioned functionality may be stored and executed on map server 706 and/or content server 708. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communication network or paths. In addition, communications circuitry may include circuitry that enables peer-to-peer communication of devices, or communication of devices in locations remote from each other.

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, or any other suitable fixed or removable storage devices, and/or any combination of the same. Non-volatile memory may also be used (e.g., to launch a boot-up routine and other instructions). Cloud-based storage (e.g., on map server 706 and/or content server 708) may be used to supplement storage 608 or instead of storage 608.

A user may send instructions to control circuitry 604 using user input interface 610 of device 600. User input interface 610 may be any suitable user interface touchscreen, touchpad, stylus and may be responsive to external device add-ons such as a remote control, mouse, trackball, keypad, keyboard, joystick, voice recognition interface, or other user input interfaces. Display 610 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Speakers 614 may be provided as integrated with other elements of user equipment device 600 or may be stand-alone units. In some embodiments, the audio may be distributed to a receiver (not shown), which processes and outputs the audio via speakers 614.

Control circuitry 604 may allow a user to provide user profile information or may automatically compile user profile information. For example, control circuitry 604 may monitor the user's visit history to identify notable landmarks for the user. Additionally, control circuitry 604 may obtain all or part of other user profiles that are related to a particular user (e.g., via social media networks), and/or obtain information about the user from other sources that control circuitry 604 may access. As a result, a user can be provided with a unified experience across the user's different devices. The user profile may specifically be used to prioritize certain locations on a virtual map for inclusion. For example, the user profile may include a record of user selected landmarks.

Figure 7:
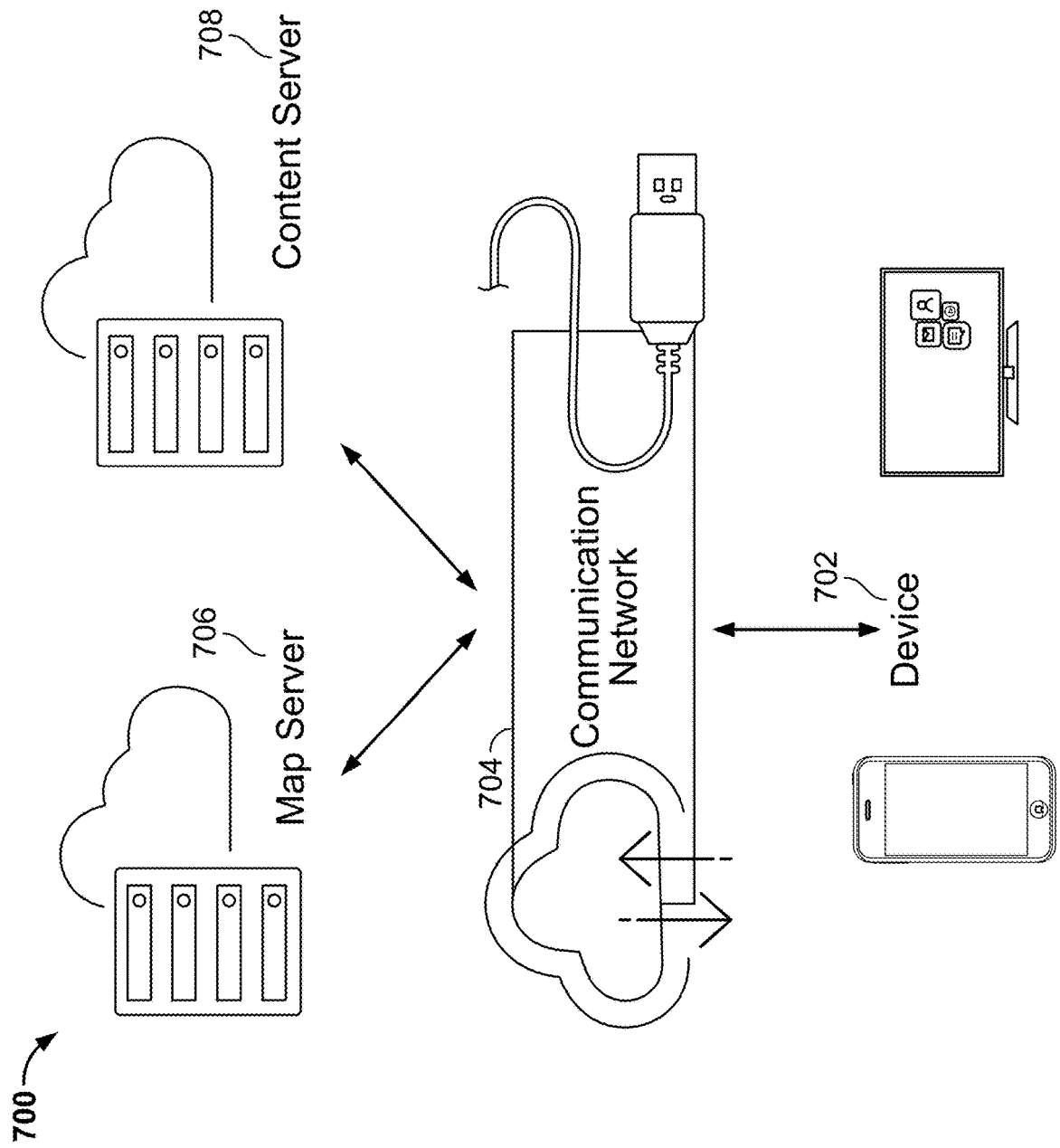
FIG. 7 is a diagram of an illustrative media system, in accordance with some embodiments of the disclosure.

As depicted in FIG. 7, device 702 may be coupled to communication network 704. Communication network 704 may be one or more networks including the Internet, a mobile phone network, mobile voice or data network (e.g., a 4G or LTE network), cable network, public switched telephone network, Bluetooth, or other types of communications network or combinations of communication network. Thus, device 702 may communicate with map server 706 and content server 708 over communication network 704 via communications circuitry described above. Map server 706 provides map information to device 702 and may also implement various processes such as landmark identification and overlay generation. Content server 708 provides content (e.g., videos, images, games, etc.) to device 702 and may also provide metadata of the content indicating overlay areas. In should be noted that there may be more than one map server 706 and/or content server 708, but only one of each is shown in FIG. 7 to avoid overcomplicating the drawing. The arrows connecting the respective device(s) and server(s) represent communication paths, which may include a satellite path, a fiber-optic path, a cable path, a path that supports Internet communications (e.g., IPTV), free-space connections (e.g., for broadcast or other wireless signals), or any other suitable wired or wireless communications path or combination of such paths.

Figure 8:
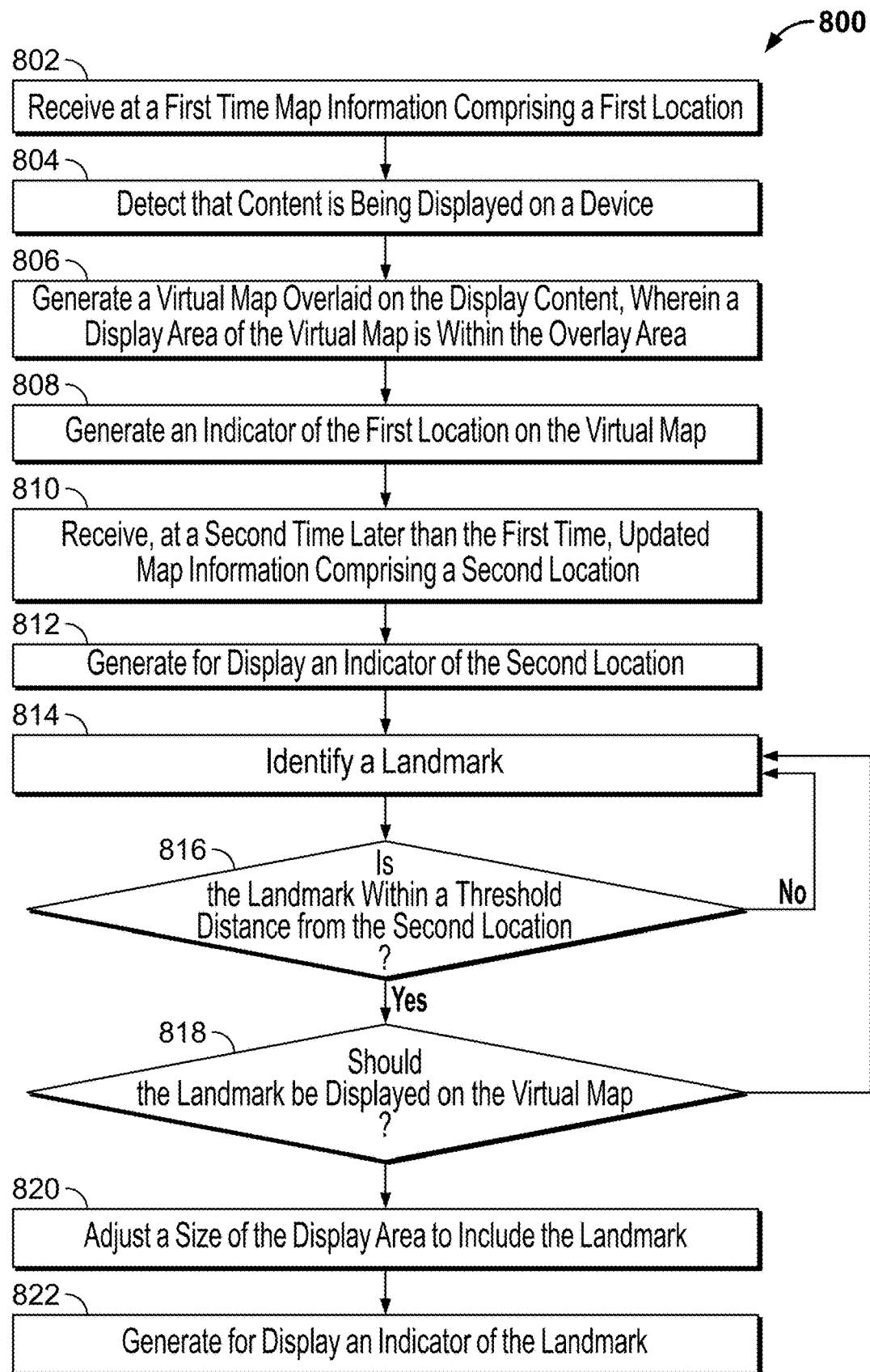
FIG. 8 is a flowchart of an illustrative process for adjusting a display size of a map overlay, in accordance with some embodiments of the disclosure.

FIG. 8 is a flowchart of illustrative process 800 for adjusting a display size of a map overlay, in accordance with some embodiments of the disclosure. At 802, control circuitry 604 receives (e.g., via I/O Path 602), at a first time, map information comprising a first location. For example, control circuitry 604 of device 702 may receive information from map server 706 via communication network 704. At 804, control circuitry 604 detects that other content is being displayed on device 702. For example, control circuitry 604 may detect that device 702 is running a media streaming application that is generating a video for display (e.g., streamed from content server 708). At 806, control circuitry 604 generates a virtual map overlaid on the display content, wherein a display area of the virtual map is within the overlay area. At 808, control circuitry 604 generates an indicator of the first location on the virtual map. The complete virtual map is shown in example 100. However, control circuitry 604 (e.g., of device 702 and/or map server 706) may identify a portion of the complete virtual map, centered around the received location, to generate on display 612 of device 702 (e.g., as shown by overlay 204 of FIG. 2).

As discussed in example 200 of FIG. 2, the intent of the mapping application is to generate an overlay of the virtual map that minimizes the obstruction of the content being accessed and maximizes the amount of relevant information displayed in the virtual map. This may involve increasing the transparency of the overlay of the virtual map and adjusting the orientation/position of the map indicators to fit the virtual map in the overlay area. As shown in FIGS. 2-4, the orientation of the virtual map in overlays 204-404 adjusts based on the number of notable landmarks in the vicinity of locations 206-406 respectively and the changing overlay area of content 202-402.

At 810, control circuitry 604 receives (e.g., via I/O Path 602), at a second time later than the first time, updated map information comprising a second location (e.g., location 306 received from map server 706 over communication network 704). At 812, control circuitry 604 generates for display an indicator of the second location (e.g., on display 612). At 814, control circuitry 604 (e.g., of device 702 and/or map server 706) identifies a landmark (e.g., Bryant Park from example 300). For example, control circuitry 604 may determine the general area in which the second location resides (e.g., Midtown Manhattan). Control circuitry 604 may then retrieve a list of landmarks comprising streets, buildings, parks, monuments, etc., associated with Midtown Manhattan from map server 706. The landmarks may be, for example, positions associated with heavy amounts of traffic, high popularity, size, and travel recommendations from other users. Map server 706 may also classify landmarks based on type (e.g., residential, commercial, tourist, etc.). At 816, control circuitry 604 determines whether the landmark is within a threshold distance from the second location. For example, the second location and the landmark may be identified using GPS coordinates, respectively, and control circuitry 604 may determine the distance between the two coordinates (e.g., 0.1 km). Control circuitry 604 may then retrieve a value of the threshold distance (e.g., 0.5 km) from storage 608 to compare with the distance.

In response to determining that the landmark is not within the threshold distance from the second location, process 800 returns to 814, where control circuitry 604 identifies a different landmark (e.g., $6^{th}$ Ave between W. $42^{nd}$ St. and W. $38^{th}$ St.). In response to determining that the landmark is within the threshold distance from the second location, process 800 advances to 818, where control circuitry 604 determines whether the landmark should be displayed on the virtual map. Control circuitry 604 may determine whether the landmark should be displayed on the virtual map by considering a user profile (e.g., stored in storage 608 of device 702 and/or map server 706). The user profile may include information about landmarks that the user has previously visited or landmarks that the user has marked as relevant. For example, the user profile may indicate that all streets, parks, restaurants, and public transportation stations in Midtown Manhattan are relevant landmarks to include in the virtual map if those identified landmarks are within the threshold distance from a given location. Control circuitry 604 may also receive indications of relevant landmarks from the user to update the user profile.

In response to determining that the landmark should not be displayed, process 800 returns to 814, where control circuitry 604 identifies a different landmark from the list of landmarks (e.g., associated with Midtown Manhattan). In response to determining that the landmark should be displayed, process 800 advances to 820, where control circuitry 604 adjusts a size of the display area to include the landmark (e.g., by increasing the size of the display area). As shown by overlay 204 and overlay 304, control circuitry 604 may extend coverage of the virtual map in a specific portion of the frame (e.g., in the bottom right portion of the virtual map to include landmarks 308). At 822, control circuitry 604 generates for display an indicator of the landmark (e.g., a visual representation of Bryant Park). The indicator as shown in example 300 is a large rectangle with centered text "Bryant Park." The user may request the removal of certain indicators from the virtual map or may select, from a plurality of indicators provided by control circuitry 604, a minimalistic indicator to reduce the amount of obstruction on the other content being viewed. In response to receiving a manual selection of a minimalistic indicator, control circuitry 604 may automatically select minimalistic indicators for presentation on the virtual map at a future time.

Figure 9:
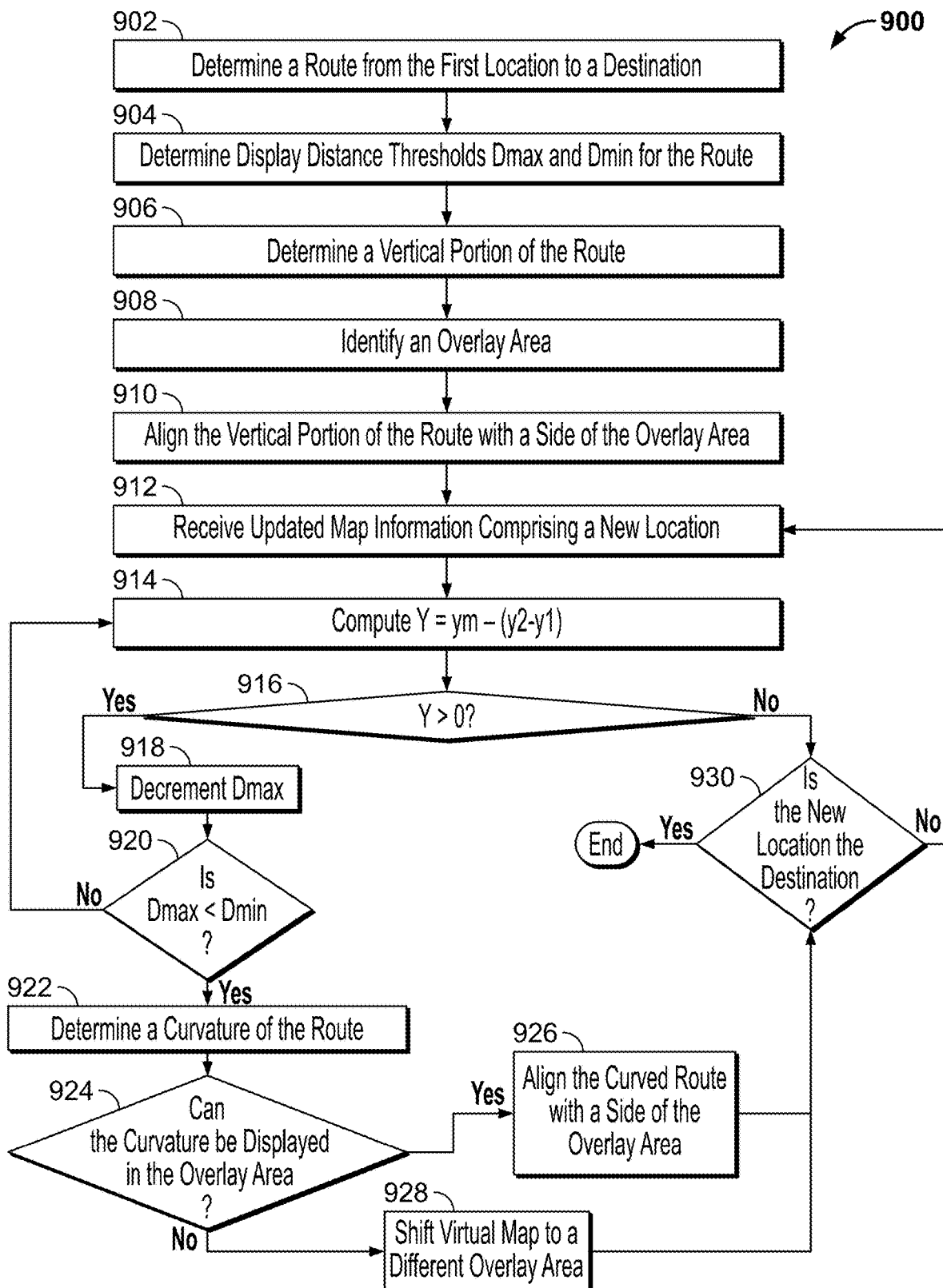
FIG. 9 is a flowchart of an illustrative process for adjusting the orientation and position of a map overlay, in accordance with some embodiments of the disclosure.

FIG. 9 is a flowchart of illustrative process 900 for adjusting the orientation and position of a map overlay, in accordance with some embodiments of the disclosure. At 902, control circuitry 604 determines a route from the first location (e.g., location 102 of FIG. 1) to a destination (e.g., destination 104). At 904, control circuitry 604 determines display distance thresholds Dmax and Dmin for the route. For example, control circuitry 604 retrieves, from storage 608, a maximum distance of the route that will be displayed on the virtual map (i.e., Dmax) and a minimum distance of the route that will be displayed on the virtual map (i.e., Dmin). Suppose the Dmax and Dmin are 2 km and 0.2 km, respectively. This means that at any given time, control circuitry 604 will display at least 0.2 km of the route and at most 2 km of the route on the virtual map. These distances, when referring to the actual frame, may be expressed in terms of pixels. For example, a length of 100 pixels may represent 0.5 km. At 906, control circuitry 604 determines a vertical portion of the route (i.e., Ym). In example 100, Ym represents the distance from location 102 to W 38$^{th}$ St along 6$^{th}$ Ave. Suppose that Ym is 2 km in length.

At 908, control circuitry 604 identifies an overlay area (e.g., overlay area 504 of FIG. 5) on which to generate the virtual map. At 910, control circuitry 604 aligns the vertical portion of the route with a side of the overlay area. In example 500, overlay 504 ranges horizontally from x1 to x2 and ranges vertically from y1 to y2. Control circuitry 604 may specifically align the vertical portion (e.g., the 2 km segment along 6$^{th}$ Ave in FIG. 1) with the vertical portion of overlay 504 (e.g., of length y2−y1). The length of the vertical portion of overlay 504 may be 1 km in this example. At 912, control circuitry 604 receives updated map information comprising a new location (e.g., via I/O Path 602 from map server 706 over communication network 704). For example, the new location (e.g., location 206) may be the progress over the route. At 914, control circuitry 604 computes the difference (Y) between the vertical portion of the route (Ym) and the vertical portion of overlay 504 (y2−y1): Y=Ym−(y2−y1). At 916, control circuitry 604 determines whether Y is greater than 0 km. Referring to the values proposed in the overarching example, the vertical length of the route may be twice as large as the vertical length on overlay 504. Y is 1 km in this case, indicating that the map overlay is able to show only half of the vertical length of the route.

In response to determining that Y is greater than 0 km, process 900 advances to 918 where control circuitry 604 decrements Dmax. It should be noted that Ym is dependent on Dmax. Referring to example 100, Dmax represents the full distance from location 102 to destination 104. In a simplistic model, Dmax can be interpreted as the hypotenuse of a right triangle. Thus, decrementing Dmax (e.g., lowering the amount of the route to display on the virtual map) reduces the length of Ym, which may be interpreted as one side of the right triangle that has Dmax as its hypotenuse. Of course, in actual maps, the direct relationship between Dmax and Ym is far more complex; nonetheless the correlation between reducing Dmax causing a reduction in Ym is retained. In this case, control circuitry 604 may decrement Dmax by the value of 0.2 km (e.g., with the decrement value being pre-determined and retrievable from storage 608 of map server 706 and/or device 702). At 920, control circuitry 604 determines whether Dmax is less than Dmin. Subsequent to the first decrement of Dmax, the value of Dmax becomes 1.8 km (which is greater than Dmin). In response to determining that Dmax is not less than Dmin, process 900 returns to 914.

However, if control circuitry 604 decremented Dmax by 1.9 km (whether in one iteration or over multiple iterations of decrementing), the value of Dmax would become 0.1 km, a value less than Dmin. In response to determining that Dmax is less than Dmin, process 900 advances to 922, where control circuitry 604 determines a curvature of the route. In the event that Dmax is less than Dmin, the virtual map exceeds the vertical space in overlay 504 even for the minimum threshold distance. This indicates to control circuitry 604 that the route should be realigned (e.g., rotated or positioned in a different overlay area) because the route is being cropped from view. The curvature of the route can be expressed as a parabola. Specifically, control circuitry 604 may use a fitting algorithm to estimate the look of the route in a mathematical expression (i.e., the curvature). At 924, control circuitry 604 determines whether the curvature can be displayed in the overlay area. For example, control circuitry 604 determines whether rotating the route may allow the route to fit within the bounds of overlay area 504. In response to determining that the route cannot be displayed in the overlay area, process 900 advances to 928, where control circuitry 604 shifts the virtual map to a different overlay area or a combination of overlay areas (e.g., overlay 502 and/or overlay 506); otherwise, process 900 advances to 926, where control circuitry 604 aligns the curved route with a side of the overlay area (e.g., a horizontal alignment of the curvature with the vector pointing from x1 to x2, a diagonal alignment of the curvature with the vector pointing from (x1, y1) to (x2, y2), etc.). For example, if the route is governed by the parabola y=x$^3$ from the bounds x=−5 to x=5, control circuitry 604 may set the end points of the parabola to the end points (x1, y1) and (x2, y2) of overlay 504 to achieve a diagonal alignment.

From 926 and 928, process 900 advances to 930, where control circuitry 604 determines whether the new location is the destination. Because control circuitry 604 may be receiving map information in real time as the location changes along the route, control circuitry 604 determines whether the destination has been reached. In response to determining that the new location is not the destination, process 900 returns to 912, where a new location is received; otherwise, process 900 ends.

It should be noted that at 916, if control circuitry 604 determines that Y is not greater than 0 km, process 900 also advances to 930 and skips 918-928. When Y (i.e., the difference between the vertical portion of the route (Ym) and the vertical portion of overlay 504 (y2−y1)) is equal to or less than 0 km, the implication is that the virtual map has enough screen space to show the route. In an ideal situation, control circuitry 604 adjusts Dmax such that Y equals 0 km. This indicates that the amount of vertical space needed to show the route and the landmarks is being fully utilized (e.g., no excess space is being allotted to the virtual map over the displayed content).

Figure 10:
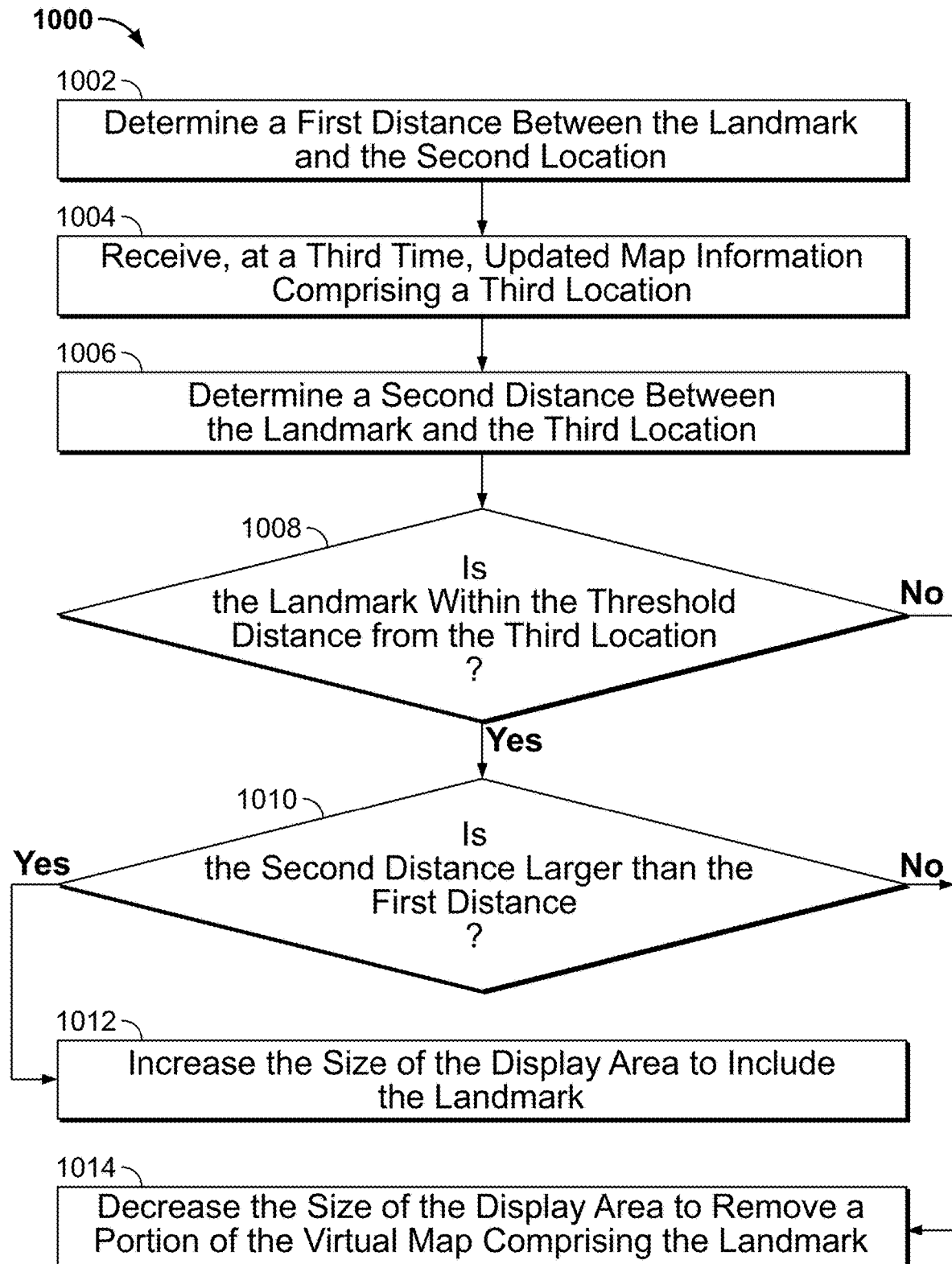
FIG. 10 is a flowchart of an illustrative process for decreasing/increasing the size of a display area based on the distance between a location on the map and a landmark, in accordance with some embodiments of the disclosure.

FIG. 10 is a flowchart of illustrative process 1000 for decreasing/increasing the size of a display area based on the distance between a location on the map and a landmark, in accordance with some embodiments of the disclosure. At 1002, control circuitry 604 determines a first distance (e.g., a displacement) between the landmark (e.g., Bryant Park from example 300) and the second location (e.g., location 306). Because landmarks may have a certain volume and may not be points in space, when determining the distance, control circuitry 604 identifies a GPS coordinate of the second location and a GPS coordinate of the furthest point in the landmark from the second location. In example 300, control circuitry 604 identifies the top right or bottom right corner of Bryant Park because the displacements between location 306 and those points are the largest from other points in Bryant Park. The first distance determined by control circuitry 604 in this case may be 0.2 km. At 1004, control circuitry 604 receives (e.g., via I/O Path 602 from map server 706 over communication network 704), at a third time, updated map information comprising a third location (e.g., location 406). At 1006, control circuitry 604 determines a second distance (e.g., a displacement) between the landmark (e.g., Bryant Park) and the third location (e.g., location 406). The second distance as determined by control circuitry 604 may be 0.7 km.

At 1008, control circuitry 604 determines whether the landmark is within the threshold distance from the third location. Control circuitry 604 retrieves from storage 608 the threshold distance (e.g., 0.5 km) to compare with the determined second distance (e.g., 0.7 km). In response to determining that the landmark is not within the threshold distance from the third location, process 1000 advances to 1014, where control circuitry 604 decreases the size of the display area to remove a portion of the virtual map comprising the landmark. As shown in example 400, because the distance between location 406 and Bryant Park has increased beyond the threshold distance, Bryant Park is no longer included in overlay 404.

In response to determining that the landmark is within the threshold distance from the third location, process 1000 advances to 1010, where control circuitry 604 determines whether the second distance is larger than the first distance. In response to determining that the second distance is not larger than the first distance, process 1000 advances to 1014, where control circuitry 604 decreases the size of the display area to remove a portion of the virtual map not comprising the landmark. This is an example in which location 406 is brought closer to a particular landmark (e.g., Bryant Park). Because the distance between the landmark and the location has decreased, it is possible that other portions of the virtual map no longer need to be displayed. Accordingly, control circuitry 604 removes the excess portions of the virtual map that are not displaying an indicator of location 406 and an indicator of the landmark. In response to determining that the second distance is larger than the first distance, process 1000 advances to 1012, where control circuitry 604 increases the size of the display area to include the landmark. In this case, the distance between the landmark and location 406 has increased, but the landmark is still within the threshold distance. Accordingly, control circuitry 604 increases the size of the display area of the virtual map to ensure that the landmark is displayed.

Figure 11:
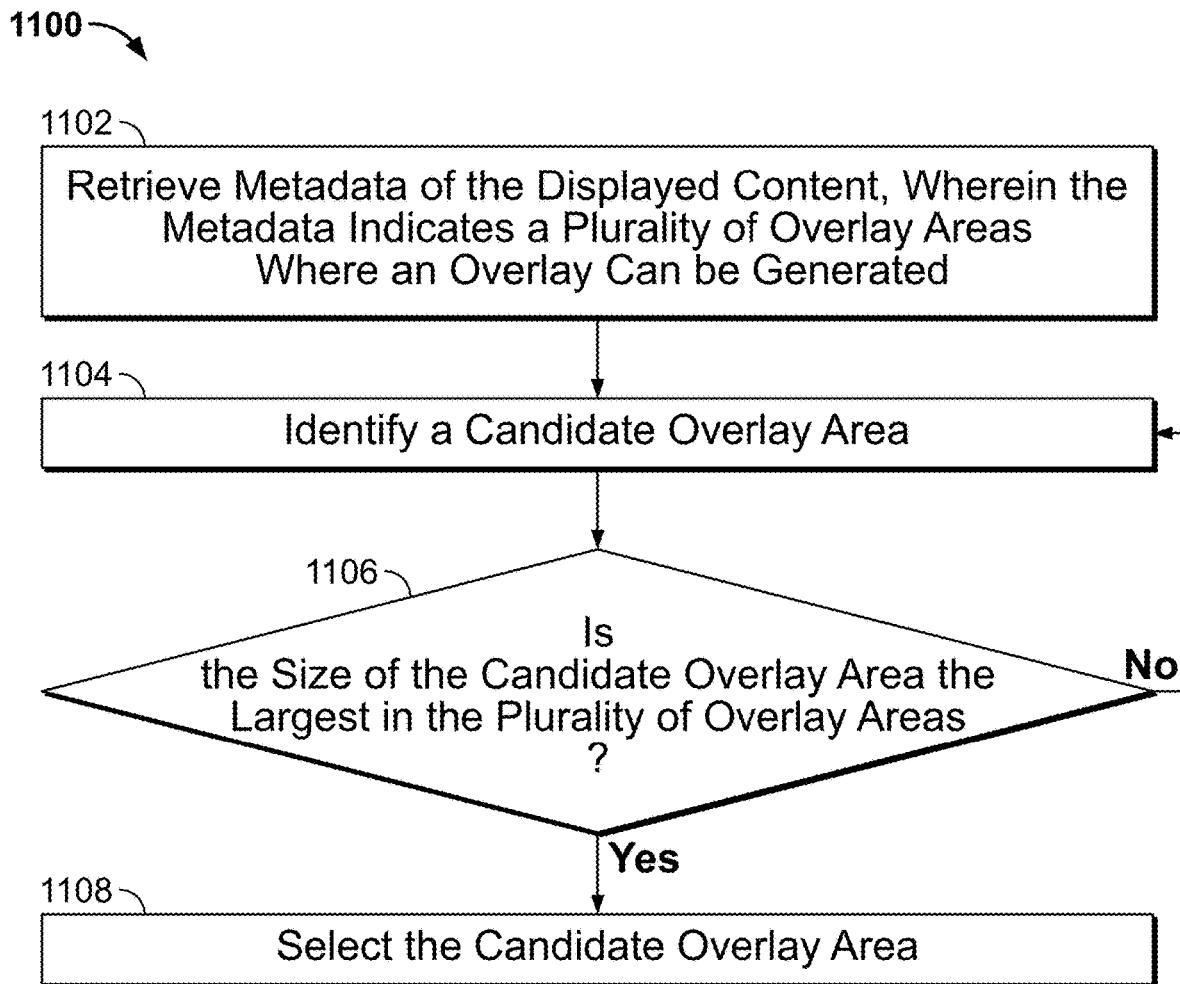
FIG. 11 is a flowchart of an illustrative process for selecting an overlay area, in accordance with some embodiments of the disclosure.

FIG. 11 is a flowchart of illustrative process 1100 for selecting an overlay area, in accordance with some embodiments of the disclosure. At 1102, control circuitry 604 retrieves metadata of the displayed content (e.g., via I/O Path 602 from content server 708 over communication network 704), wherein the metadata indicates a plurality of overlay areas where an overlay can be generated. For example, the metadata may include a data structure of pixel coordinates that represent boundaries of an overlay area for a particular frame. At 1104, control circuitry 604 identifies a candidate overlay area for a given frame. At 1106, control circuitry 604 determines whether the size of the candidate overlay area is the largest in the plurality of overlay areas. For example, for any given frames, there may be multiple portions where an overlay can be generated such that the overlay is not obstructing important portions of the frame. Control circuitry 604 searches for the largest of the overlay areas. In response to determining that the size of the candidate overlay area is not the largest in the plurality of overlay areas, process 1100 returns to 1104, where control circuitry 604 identifies a different candidate overlay area. In response to determining that the size of the candidate overlay area is the largest in the plurality of overlay areas, process 1100 advances to 1108, where control circuitry 604 selects the candidate overlay area.

It should be noted that processes 800-1100 or any step thereof could be performed on, or provided by, any of the devices shown in FIGS. 6-7. For example, the processes may be executed by control circuitry 604 (FIG. 6) as instructed by a mapping application implemented on device 702 and/or servers 706 and/or 708. In addition, one or more steps of a process may be incorporated into or combined with one or more steps of any other process or embodiment (e.g., steps from process 800 may be combined with steps from process 900). In addition, the steps and descriptions described in relation to FIGS. 8-11 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. In addition, the systems and methods described herein may be performed in real time. It should also be noted, the systems and/or methods described above may be applied to, or used in accordance with, other systems and/or methods.

What is claimed is:

1. A method for adjusting a display size of a map overlay, the method comprising:
   receiving, at a first time, map information comprising a first location;
   detecting that content is being displayed on a device;
   determining an overlay area on the displayed content;
   generating, for display on the device, a virtual map overlaid on the displayed content, wherein (1) the virtual map is within the overlay area and (2) the virtual map comprises an indicator of the first location;
   receiving, at a second time later than the first time, updated map information comprising a second location;
   identifying a landmark within a threshold distance from the second location, wherein the landmark is not yet displayed on the virtual map;
   in response to the identifying the landmark within the threshold distance from the second location, without a user input requesting to adjust a size of the virtual map, adjusting the size of the virtual map such that adjusted virtual map displays the landmark that was not displayed on the virtual map prior to the adjusting; and
   generating for display both an indicator of the landmark and an indicator of the second location on the virtual map.

2. The method of claim 1, wherein adjusting the size of the virtual map comprises increasing the size until the virtual map equals a size of the overlay area.

3. The method of claim 1, further comprising:
   receiving, at a third time, updated map information comprising a third location; and
   in response to determining that the landmark is not within the threshold distance from the third location, decreasing the size of the virtual map.

4. The method of claim 3, wherein decreasing the size of the virtual map comprises cropping the virtual map to remove a portion of the virtual map comprising the landmark.

5. The method of claim 1, further comprising:
   detecting that a size of the overlay area has decreased;
   determining whether the size of the virtual map is greater than the decreased size of the overlay area;
   in response to determining that the size of the virtual map is greater than the decreased size of the overlay area, decreasing the size of the virtual map.

6. The method of claim 1, wherein determining the overlay area comprises:

retrieving metadata of the displayed content, wherein the metadata indicates a plurality of overlay areas where an overlay can be generated;

identifying, from the plurality of overlay areas, a candidate overlay area;

determining whether a size of the candidate overlay area is greater than respective sizes of overlay areas in the plurality of overlay areas; and in response to determining that the size of the candidate overlay area is greater than the respective sizes of the overlay areas in the plurality of overlay areas, selecting the candidate overlay area as the overlay area on which to generate the virtual map.

7. The method of claim 1, wherein identifying the landmark comprises:

identifying, in a user profile stored on the device, a plurality of landmarks previously visited by a user associated with the user profile;

determining a distance between a landmark of the plurality of landmarks and the second location;

determining whether the distance is less than the threshold distance; and in response to determining that the distance is less than the threshold distance, selecting the landmark of the plurality of landmarks to include in the virtual map.

8. The method of claim 1, wherein the virtual map is transparent, further comprising:

identifying a first portion of the displayed content and a second portion of the virtual map, wherein the first portion and the second portion overlap;

determining a first color of the displayed content in the first portion; and adjusting, in the second portion, a second color of the virtual map to modify contrast between the virtual map and the displayed content.

9. The method of claim 1, wherein the map information comprises directions from the first location to a destination, further comprising:

determining a virtual path between an indicator of the first location and an indicator of the destination; and rotating the virtual map to simultaneously display the indicator of the first location and the indicator of the destination on the virtual map without adjusting the size of the virtual map.

10. The method of claim 1, further comprising increasing a range of land depicted in the virtual map by shrinking visual content in the virtual map.

11. A system for adjusting a display size of a map overlay, the system comprising:

control circuitry configured to:

receive, at a first time, map information comprising a first location;

detect that content is being displayed on a device;

determine an overlay area on the displayed content;

generate, for display on the device, a virtual map overlaid on the displayed content, wherein (1) the virtual map is within the overlay area and (2) the virtual map comprises an indicator of the first location;

receive, at a second time later than the first time, updated map information comprising a second location;

identify a landmark within a threshold distance from the second location, wherein the landmark is not yet displayed on the virtual map;

in response to the identifying the landmark within the threshold distance from the second location, without a user input requesting to adjust a size of the virtual map, adjust the size of the virtual map such that adjusted virtual map displays the landmark that was not displayed on the virtual map prior to the adjusting; and generate for display both an indicator of the landmark and an indicator of the second location on the virtual map.

12. The system of claim 11, wherein the control circuitry is configured to adjust the size of the virtual map by increasing the size until the virtual map equals a size of the overlay area.

13. The system of claim 11, wherein the control circuitry is further configured to:

receive, at a third time, updated map information comprising a third location; and in response to determining that the landmark is not within the threshold distance from the third location, decrease the size of the virtual map.

14. The system of claim 13, wherein the control circuitry is configured to decrease the size of the virtual map by cropping the virtual map to remove a portion of the virtual map comprising the landmark.

15. The system of claim 11, wherein the control circuitry is further configured to:

detect that a size of the overlay area has decreased;

determine whether the size of the virtual map is greater than the decreased size of the overlay area;

in response to determining that the size of the virtual map is greater than the decreased size of the overlay area, decrease the size of the virtual map.

16. The system of claim 11, wherein the control circuitry is configured to determine the overlay area by:

retrieving metadata of the displayed content, wherein the metadata indicates a plurality of overlay areas where an overlay can be generated;

identifying, from the plurality of overlay areas, a candidate overlay area;

determining whether a size of the candidate overlay area is greater than respective sizes of overlay areas in the plurality of overlay areas; and in response to determining that the size of the candidate overlay area is greater than the respective sizes of the overlay areas in the plurality of overlay areas, selecting the candidate overlay area as the overlay area on which to generate the virtual map.

17. The system of claim 11, wherein the control circuitry is configured to identify the landmark by:

identifying, in a user profile stored on the device, a plurality of landmarks previously visited by a user associated with the user profile;

determining a distance between a landmark of the plurality of landmarks and the second location;

determining whether the distance is less than the threshold distance; and in response to determining that the distance is less than the threshold distance, selecting the landmark of the plurality of landmarks to include in the virtual map.

18. The system of claim 11, wherein the virtual map is transparent, and wherein the control circuitry is further configured to:

identify a first portion of the displayed content and a second portion of the virtual map, wherein the first portion and the second portion overlap;

determine a first color of the displayed content in the first portion; and adjust, in the second portion, a second color of the virtual map to modify contrast between the virtual map and the displayed content.

19. The system of claim 11, wherein the map information comprises directions from the first location to a destination, and wherein the control circuitry is further configured to:
   determine a virtual path between an indicator of the first location and an indicator of the destination; and
   rotate the virtual map to simultaneously display the indicator of the first location and the indicator of the destination on the virtual map without adjusting the size of the virtual map.

20. The system of claim 11, wherein the control circuitry is further configured to increase a range of land depicted in the virtual map by shrinking visual content in the virtual map.

21. The method of claim 1, wherein the second location is not yet displayed on the virtual map prior to the adjusting.

* * * * *